(12) United States Patent
Saville

(10) Patent No.: US 8,012,243 B2
(45) Date of Patent: Sep. 6, 2011

(54) GAS DEHYDRATOR FOR A WELL

(75) Inventor: Codey Alan Saville, Lloydminster (CA)

(73) Assignee: Brightling Equipment Ltd. (CA)

( * ) Notice: Subject to any disclaimer, the term of this patent is extended or adjusted under 35 U.S.C. 154(b) by 235 days.

(21) Appl. No.: 12/414,908

(22) Filed: Mar. 31, 2009

(65) Prior Publication Data

US 2010/0242732 A1 Sep. 30, 2010

(51) Int. Cl.
*B01D 45/00* (2006.01)
(52) U.S. Cl. .......... 95/267; 55/440; 166/105.5; 166/266
(58) Field of Classification Search ............ 55/440; 95/267; 166/54.1, 68.5, 105.5, 266
See application file for complete search history.

(56) References Cited

U.S. PATENT DOCUMENTS

| | | | |
|---|---|---|---|
| 4,226,284 A | 10/1980 | Evans | |
| 5,333,684 A | 8/1994 | Walter et al. | |
| 5,588,486 A | 12/1996 | Heinrichs | |
| 6,629,566 B2 | 10/2003 | Liknes | |
| 6,688,857 B1 | 2/2004 | Choroszylow et al. | |
| 6,962,199 B1 | 11/2005 | Tjeenk Willink | |
| 7,204,314 B2 | 4/2007 | Lauritzen et al. | |
| 7,207,385 B2 * | 4/2007 | Smith et al. .................. | 166/265 |
| 7,219,500 B1 | 5/2007 | Rhodes | |

* cited by examiner

*Primary Examiner* — Robert A Hopkins
(74) *Attorney, Agent, or Firm* — Dykas & Shaver, LLP

(57) ABSTRACT

An apparatus is disclosed for removing water from gases produced from a hydrocarbon reservoir penetrated by a well, the apparatus comprising: a first conduit extending through the well for producing gases; a second conduit extending through the well for producing liquid hydrocarbons; a pump connected to pump liquid hydrocarbons from the hydrocarbon reservoir through the second conduit; and a gas dehydrator located in the first conduit below a ground surface for removing water from produced gases flowing through the first conduit. A method is also disclosed for removing water from gases produced from a hydrocarbon reservoir penetrated by a well, the method comprising: flowing gases from a hydrocarbon reservoir through a first conduit extending through the well; at least partially dehydrating the gases by flowing the gases through a gas dehydrator located in the first conduit below a ground surface; and pumping liquid hydrocarbons from the hydrocarbon reservoir through a second conduit extending through the well.

19 Claims, 5 Drawing Sheets

GAS DEHYDRATOR FOR A WELL

TECHNICAL FIELD

This document relates to gas dehydrators for oil and gas wells.

BACKGROUND

Gas streams produced from a well carry varying amounts of water vapor. Before the produced gas can be used, for example combusted or transported, the water must be removed. This removal is typically accomplished with surface mounted dehydration units, complex machinery, or chemical addition units such as a glycol contactor or methanol injector. However, in areas where the ambient temperature can drop below 0° C., the water can freeze when or before it reaches surface equipment, for example in a surface pump, surface dehydration unit, or along the steel tubing of the production string, thus hampering or preventing effective dehydration. Such freezing can render dehydration units useless.

If water vapor is not adequately removed, the gas cannot be used in well site internal combustion engines without causing premature failure. Thus, the produced gas is often vented to the atmosphere, and alternative energy sources, for example propane or electricity, used to power such engines. Thus, energy producers are forced to raise their production costs, while a valuable source of energy is wasted to the atmosphere.

There is thus a need for an effective gas dehydrator that can reliably remove water from produced gas, despite sub-zero surface temperatures. Further, there is a need for simpler, more cost effective methods and apparatuses for dehydrating produced gas.

SUMMARY

There is disclosed a method and apparatus for removing water vapor from produced gas in a hydrocarbon producing well. These methods and apparatuses use a downhole apparatus designed to dehydrate hydrocarbon gases subsurface.

An apparatus is disclosed for removing water from gases produced from a hydrocarbon reservoir penetrated by a well, the apparatus comprising: a first conduit extending through the well for producing gases; a second conduit extending through the well for producing liquid hydrocarbons; a pump connected to pump liquid hydrocarbons from the hydrocarbon reservoir through the second conduit; and a gas dehydrator located in the first conduit below a ground surface for removing water from produced gases flowing through the first conduit.

A method is also disclosed for removing water from gases produced from a hydrocarbon reservoir penetrated by a well, the method comprising: flowing gases from a hydrocarbon reservoir through a first conduit extending through the well; at least partially dehydrating the gases by flowing the gases through a gas dehydrator located in the first conduit below a ground surface; and pumping liquid hydrocarbons from the hydrocarbon reservoir through a second conduit extending through the well.

An apparatus is also disclosed for removing water from gases produced from a hydrocarbon reservoir penetrated by a well, the apparatus comprising: a first conduit extending through the well for producing gases; a second conduit extending through the well for producing liquid hydrocarbons; a pump connected to pump liquid hydrocarbons from the hydrocarbon reservoir through the second conduit; and a series of gas dehydrator plates distributed along a portion of the first conduit and disposed at least partially across a gas-flow through the first conduit to define a gas channel that allows produced gases to flow through the series of gas dehydrator plates.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
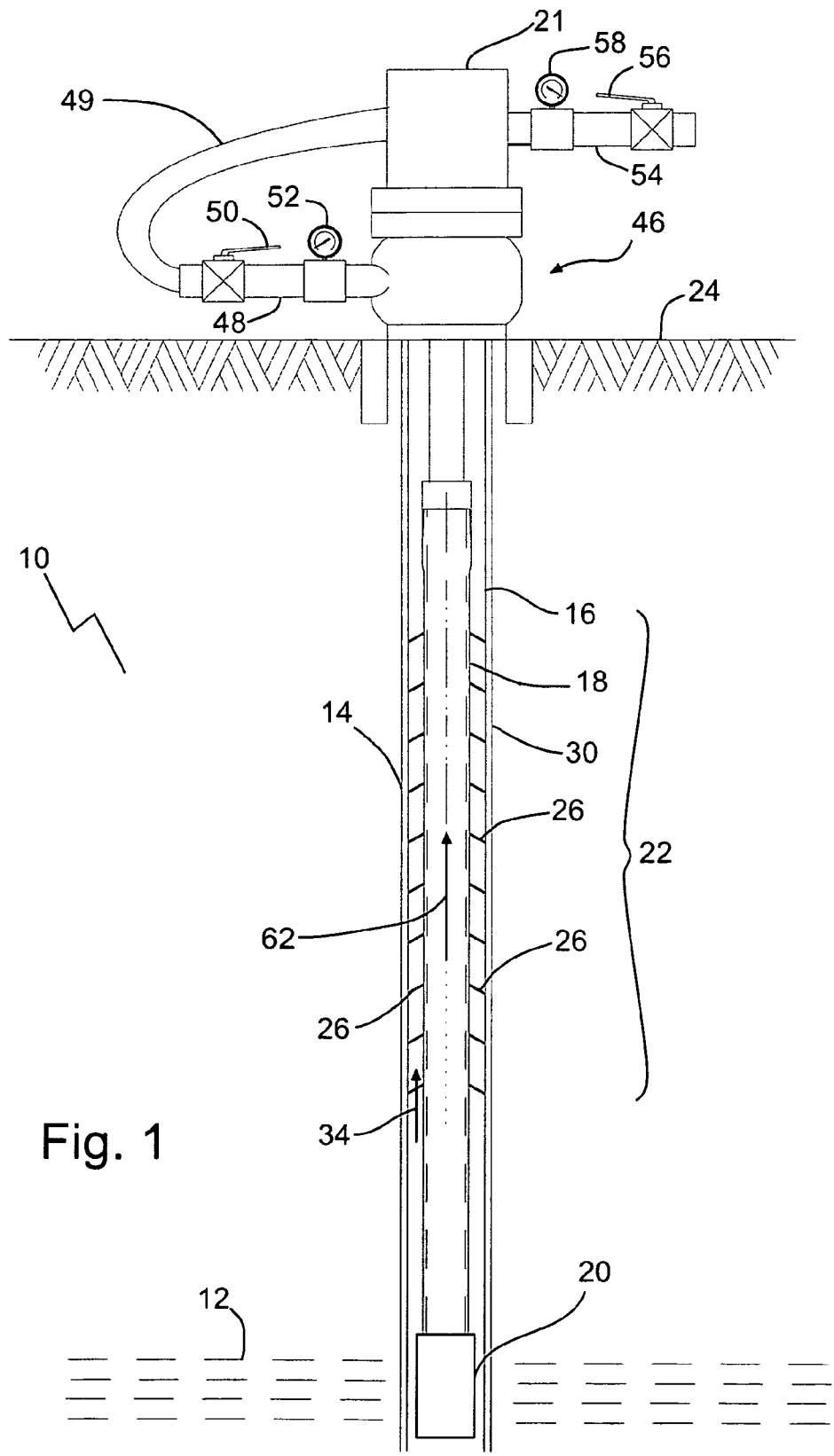
FIG. 1 is a side elevation view, partially in section, of an apparatus for removing water from gases produced from a hydrocarbon reservoir penetrated by a well.
Figure 4:
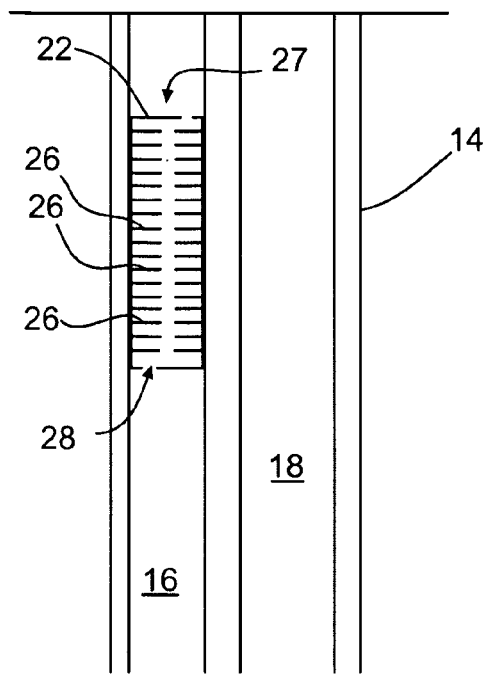
FIG. 4 is a side elevation view, in section, of a further embodiment of an apparatus for removing water from gases produced from a hydrocarbon reservoir penetrated by a well.

In many wells, gas and liquids are produced, for example by natural or assisted methods. Referring to FIG. 1, an apparatus 10 for removing water from gases produced from a hydrocarbon reservoir 12 penetrated by a well 14 is illustrated. Referring to FIGS. 1 and 4, apparatus 10 comprises a first conduit 16, a second conduit 18, a pump 20 (FIG. 1 only), and at least one gas dehydrator 22. Referring to FIG. 1, first conduit 16, for example an annulus defined for further example between well casing 30 and second conduit 18, extends through well 14 for producing gases, such as methane and light hydrocarbons. The annulus may be defined by other tubulars in the well 14. Second conduit 18 extends through well 14 for producing liquids, for example liquid hydrocarbons and water. Pump 20 is connected to pump the liquid hydrocarbons from the hydrocarbon reservoir 12 through, for example up, the second conduit 18. Gas dehydrator 22 is located in the first conduit 16 below ground surface 24, for example a sufficient distance below ground surface 24 such that the ambient temperature is above freezing, and removes water from produced gases flowing through the first conduit 16.

Figure 2:
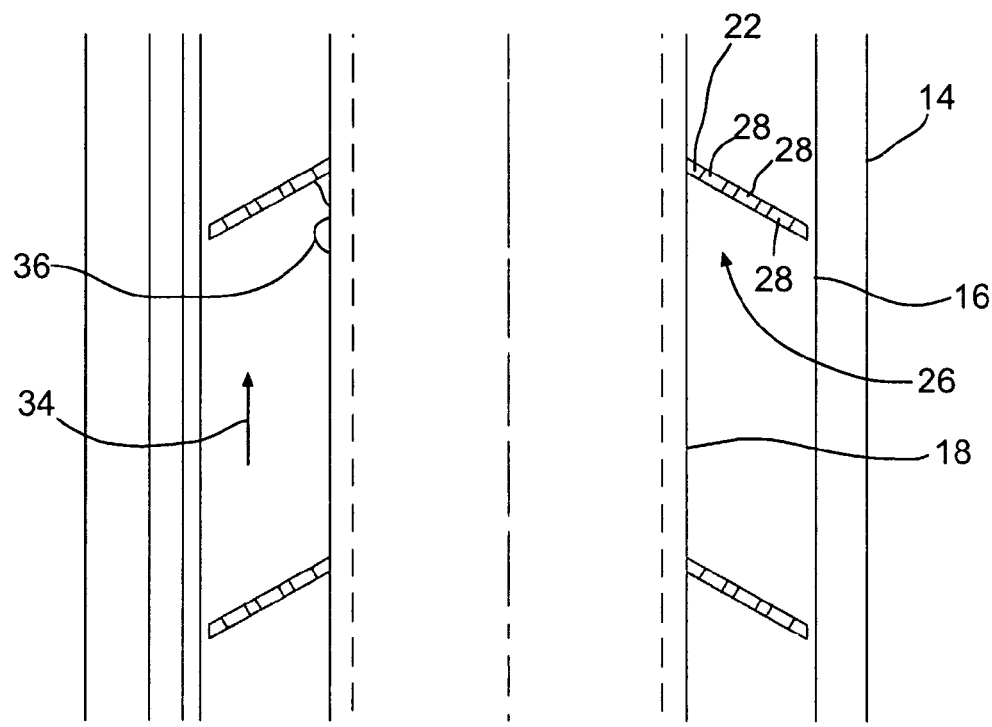
FIG. 2 is a side elevation view, in section, of a series of condensation surfaces used with the apparatus of FIG. 1.
Figure 3:
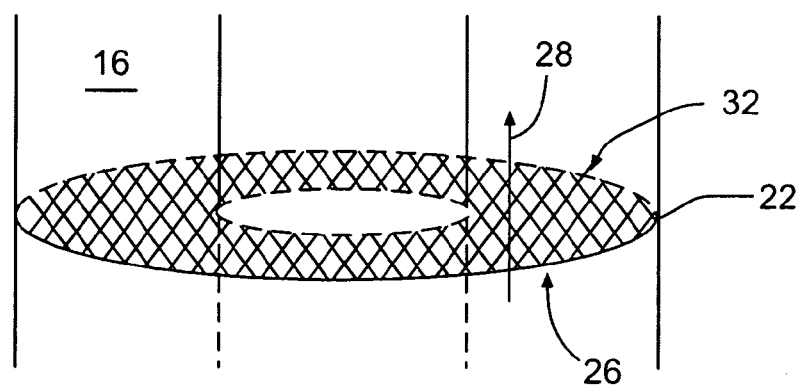
FIG. 3 is a perspective view, in section, of another embodiment of a condensation surface.
Figure 6:
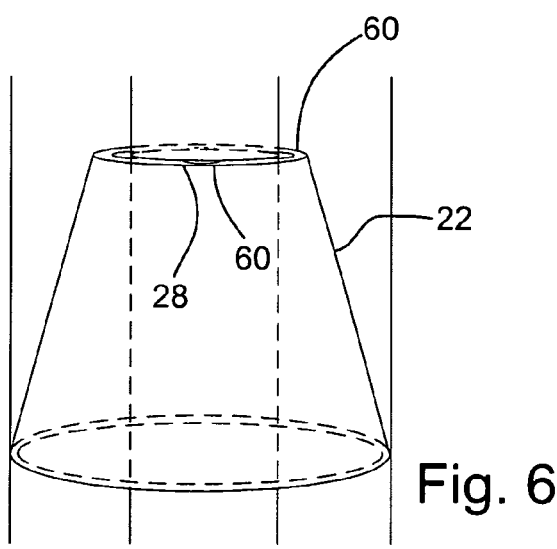
FIG. 6 is a perspective view, in section, of a further embodiment of a condensation surface.
Figure 7:
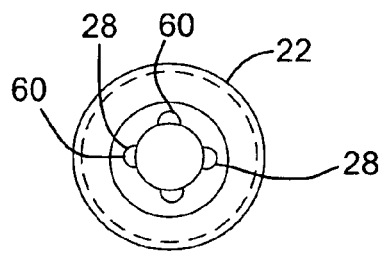
FIG. 7 is a plan view, in section, of the condensation surface of FIG. 6.

Referring to FIGS. 1-2, gas dehydrator 22 may further comprise a series of condensation surfaces 26. A suitable surface 26 may comprise for example a screen (shown as screen 32 in FIG. 3), or a plate (shown in FIGS. 2 and 11). Referring to FIGS. 2-4, surfaces 26 are distributed along a portion, for example the entirety, of first conduit 16, and are disposed at least partially across, for example transversely (shown in FIG. 3), a gas-flow (identified by numeral 34 in FIGS. 1 and 2 for example) through first conduit 16. Surfaces 26 define a gas channel 28 that allows produced gases to flow through gas dehydrator 22 and continue along first conduit 16. Referring to FIG. 2, at least one of condensation surfaces 26 may be tapered, for example in a linear (as shown) or curved fasion. At least one surface 26 may be frusto-conical in shape, as illustrated for example in the embodiment of FIGS. 6-7. Frusto-conical gas dehydrators may be shaped like sawed off witchhats, and may be easily installed in, for example attached to, conduit 18 as an insert. Referring to FIG. 4, as indicated at least one surface 26 may be defined by a plate (shown as surfaces 26), and in further embodiments the gas dehydrator 22 may form a plate-like structure 27 of surfaces 26 as shown at least partially transverse to an axis of the conduit 16. In the embodiment of FIG. 4, structure 27 acts somewhat like a vigreux or fractionating condenser, removing water as a result of greatly increased surface area.

Referring to FIG. 2, gas traveling through first conduit 16 in the direction indicated by arrow 34 carries water vapor. When the gas reaches surface 26, the gas is forced to divert through channel 28 to continue up conduit 16. In addition to surface 26, channel 28 may be defined by additional elements, for example the casing 30 and conduit 18. The presence of surface 26 effectively increases the surface area over which the gas passes, thus allowing water in the gas a greatly increased opportunity to condense out from the moving gas. In the embodiment shown, the condensed water 36 can then drain back down the tubing string or drip down the well, where it may be removed via conduit 18. Tapering of surface 26 may assist in guiding the draining of water, as well as increasing the surface area of surface 26. It should be understood that gas dehydrators as disclosed herein may have more than one condensation surface 26, as for example in the embodiment of FIG. 8 where a gas dehydrator 22 has interior and exterior surfaces 26A, B.

Figure 8:
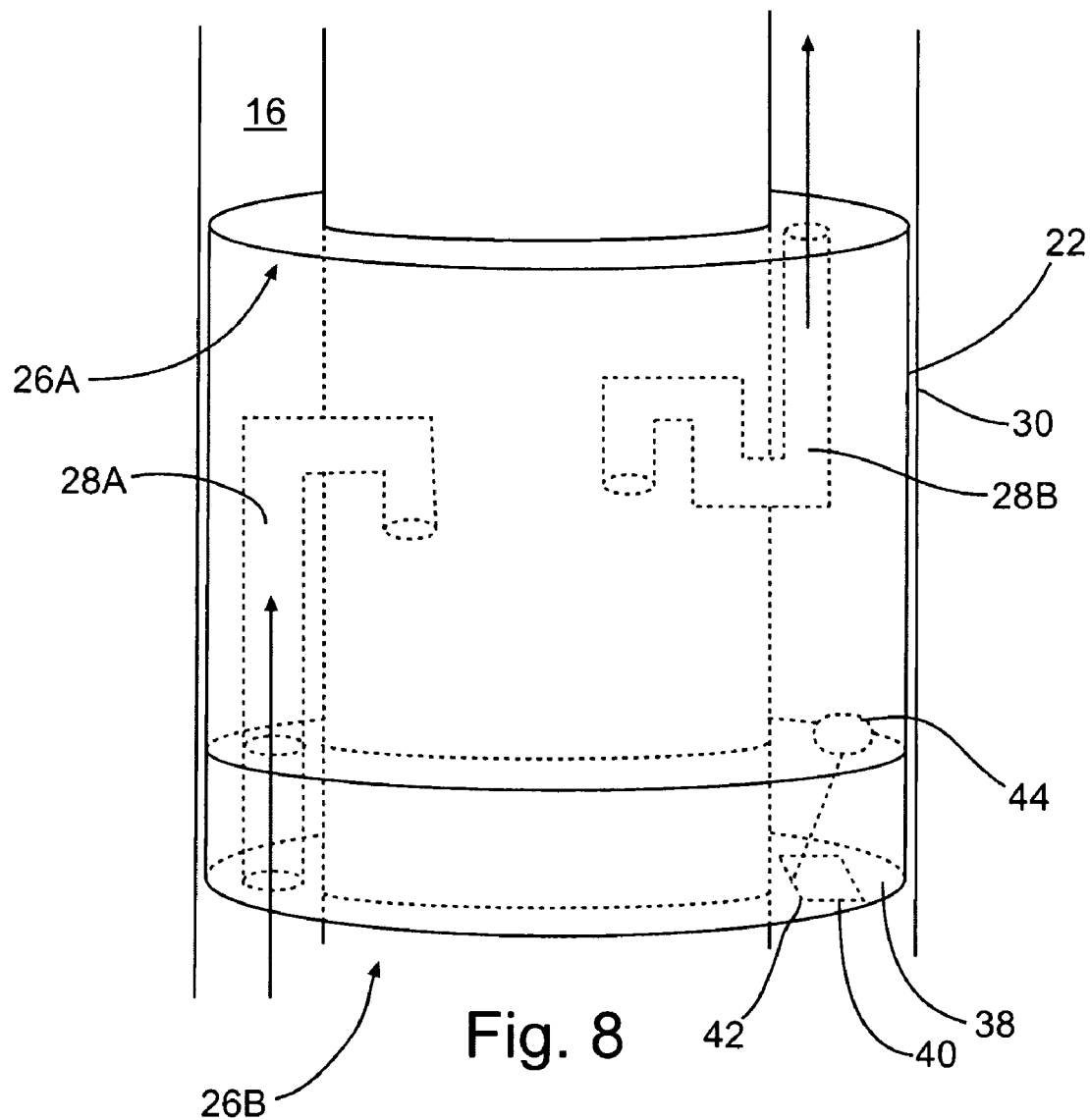
FIG. 8 is a perspective section view of a further embodiment of a gas dehydrator.

Referring to FIG. 8, in some embodiments a gas dehydrator 22 is illustrated with at least one condensation surface, for example surface 26A, comprising a basin 38 connected to receive condensed water draining from surface 26A. In the illustration of FIG. 8, channel 28 has an input 28A and an output 28B. While gas is traveling through gas dehydrator 22, water is deposited on the inside of gas dehydrator 22, the water then draining into basin 38 where it is collected. The water may then be removed from the basin, for example by pumping it to the surface via another conduit (not shown) or by allowing it to drain back down the tubing string. For the latter case, a drain 40 may be provided at a bottom of the basin 38. The drain may be covered by a hatch 42, for example configured to open for example by remote or automatic control, under selected conditions, for example when the water level reaches a predetermined level. This may be accomplished using a float 44 attached to open hatch 42. The gas dehydrator 22 of FIG. 8 may be configured to fit with close tolerance within first conduit 16, in order to divert all or a majority of the gas flow into and through channel 28.

Figure 11:
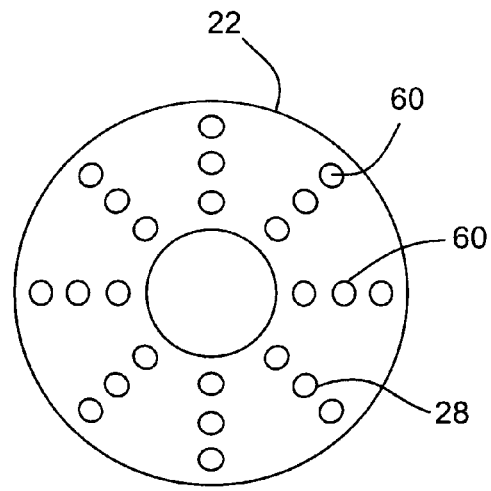
FIG. 11 is a top plan view of an embodiment of a condensation surface.

Referring to FIG. 3, at least one surface 26 may be perforated, in order to define channel 28. Referring to FIG. 2, by providing additional perforations (illustrated by channels 28), resistance to gas flow is decreased, while a large surface area is maintained for water to contact surface 26 and be removed from the gas flow. Referring to FIG. 11, another embodiment of surface 26 is illustrated with perforations 60. Surface 26 may be for example a horizontal plate.

Referring to FIG. 1, in some embodiments, an internal combustion engine (shown for example as a drive 21 for pump 20) may be provided at the ground surface 24 connected for example by line 49 to be powered by gases produced from conduit 16. Because gas dehydrators 22 have effectively removed water from the fuel gas upon the gases reaching the surface 24, the gas may be sent directly to the engine for use. In some cases, additional processing, for example to remove sour gas, may be required prior to using the gas. In the example shown, drive 21 is connected to power the pump 20. Drive 21 may be for example a donkeyhead, rotary, or other suitable drive for a pump. Pump 20 is always positioned downhole, but drive 21 may be positioned at any suitable position on the surface or downhole. Examples of downhole drives include mud motors, electric submersible, and hydraulic pumps.

Various other components may make up part of the apparatus 10, for example various wellhead 46 components. In the embodiment illustrated, gas is produced from conduit 16 into line 48, passing by a valve 50 and a regulator 52 for example. The gas may then be stored, processed, transported, or used to power various well site equipment, for example a catalytic heater (not shown). Liquids pumped up conduit 18 may be transported into line 54, passing through a valve 56 and flow-meter 58 for example, passing through pump 20. The liquids may then be processed, for example to remove water, stored, or transported.

Because gas dehydrator 22 is located downhole, for example at least ten, twenty, thirty feet below ground, the ambient temperatures experienced in the vicinity of the gas dehydrator 22 will be stable and consistently above freezing. Thus, subsurface gas dehydrators 22 can efficiently remove water vapor from produced gas without the water freezing. By increasing the number of condensation surfaces 26, such as spacing gas dehydrator plates at intervals along a portion of the first conduit 16 as shown, greater efficiency of water removal can be achieved. For example, at least two gas dehydrators 22 may be axially spaced from one another in the first conduit 16 starting at least ten feet below a ground level 24.

Various conduit arrangements are possible, for example laterally spaced tubing strings, including parallel tubing strings (illustrated in FIG. 4). Other arrangements include a tube in an annulus (illustrated in FIG. 3), for example concentric tubing strings. Other components and tubing strings may be present.

Figure 9:
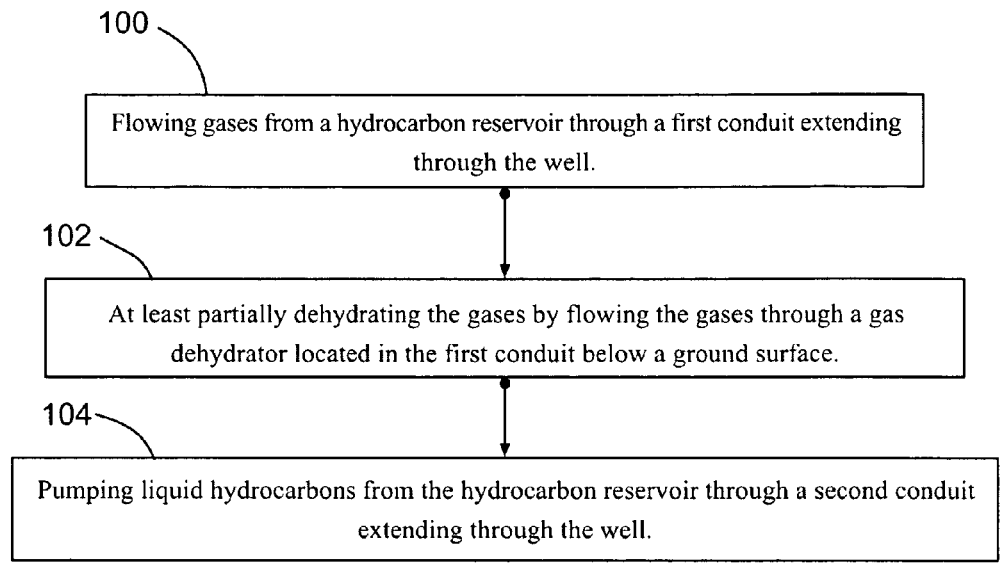
FIG. 9 is a flowchart illustrating a method of removing water from gases produced from a hydrocarbon reservoir penetrated by a well.

Referring to FIG. 9, a method for removing water from gases produced from a hydrocarbon reservoir penetrated by a well is illustrated. Referring to FIG. 1, in a stage 100 (shown in FIG. 9), gases are flowed from reservoir 12 through a first conduit 16 extending through the well 14, which may include for example a horizontal portion (not shown). Referring to FIG. 2, in a stage 102 (shown in FIG. 9), the gases are at least partially dehydrated by flowing through a gas dehydrator, for example gas dehydrator 22, located in the first conduit 16. Referring to FIG. 1, in a stage 104 (shown in FIG. 9), liquid hydrocarbons are pumped through a second conduit 18, for example in the direction indicated by arrow 62.

Referring to FIG. 1, in some embodiments an apparatus 10 has a series of gas dehydrator plates (illustrated by for example surfaces 26, for further example at least 3, 5, 10 and in some cases more than 25 surfaces 26) spaced along at least a portion of the first conduit 16. Each gas dehydrator plate 26 is disposed at least partially across a gas-flow (for example flow 34) of produced gas flowing through the first conduit 16 to define a gas channel (for example channel 28) that allows produced gases to flow through the first conduit 16 and the series of plates. Referring to FIG. 11, at least one plate may be perforated.

Figure 5:
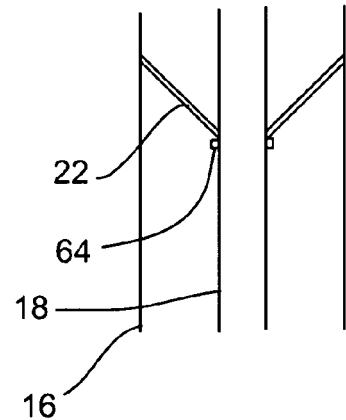
FIG. 5 is a side elevation view, in section, of a further embodiment of a condensation surface.
Figure 10:
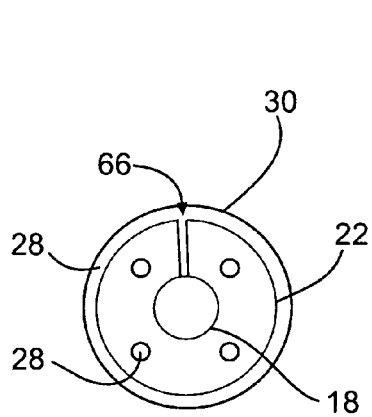
FIG. 10 is a top plan view of an embodiment of a flexible condensation surface.

The gas dehydrators disclosed herein may be provided as inserts, for example as inserts onto the production tubing that makes up conduit 18. Referring to FIG. 5, this is illustrated, as surface 26 is held in place by gravity and for example a ledge or notch 64 in conduit 18. In other embodiments, surfaces 26 may be integral with at least one of conduits 16, 18, or casing 30. Condensation surfaces 26 may be made of any suitable material, for example rigid or flexible material. Referring to FIG. 10, an embodiment of a surface 26 is illustrated where surface 26 is made of flexible material. That way, condensation surface 26 may be easily attached to the outside of a tubing string (conduit 18) for example, by provision of a cutout portion 66 which allows the gas dehydrator 22 to be flexed and manipulated into place around conduit 18.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus for removing water from gases produced from a hydrocarbon reservoir penetrated by a well, the apparatus comprising:
   a first conduit extending through the well for producing gases;
   a second conduit extending through the well for producing liquid hydrocarbons;
   a pump connected to pump liquid hydrocarbons from the hydrocarbon reservoir through the second conduit;
   a gas dehydrator located in the first conduit below a ground surface for removing water from produced gases flowing through the first conduit;
   in which the gas dehydrator further comprises a series of condensation surfaces distributed along a portion of the first conduit and disposed at least partially across a gas-flow through the first conduit to define a gas channel that allows produced gases to flow through the gas dehydrator; and
   in which at least a portion of at least one condensation surface is tapered.

2. The apparatus of claim 1 in which at least one condensation surface comprises a basin connected to receive water that condenses on the condensation surface.

3. The apparatus of claim 2 in which the basin has a drain at a bottom of the basin.

4. The apparatus of claim 3 in which the basin comprises a float operated hatch over the drain for draining the basin.

5. The apparatus of claim 1 in which at least one condensation surface comprises a screen.

6. The apparatus of claim 1 in which at least one condensation surface is frustoconical in shape.

7. The apparatus of claim 1 in which at least one condensation surface is defined by a plate.

8. The apparatus of claim 1 in which at least one condensation surface is perforated.

9. The apparatus of claim 1 in which the first conduit comprises an annulus.

10. The apparatus of claim 9 in which the annulus is defined between well casing and the second conduit.

11. The apparatus of claim 1 further comprising an internal combustion engine at the surface connected to be powered by gases produced from the first conduit.

12. The apparatus of claim 11 in which the internal combustion engine is connected to power the pump.

13. The apparatus of claim 1 in which the gas dehydrator is spaced at least ten feet below the ground surface.

14. A method for removing water from gases produced from a hydrocarbon reservoir penetrated by a well, the method comprising:
   flowing gases from a hydrocarbon reservoir through a first conduit extending through the well;
   at least partially dehydrating the gases by flowing the gases through a gas dehydrator located in the first conduit below a ground surface, in which the gas dehydrator further comprises a series of condensation surfaces distributed along a portion of the first conduit and disposed at least partially across a gas-flow through the first conduit to define a gas channel that allows produced gases to flow through the gas dehydrator, in which at least a portion of at least one condensation surface is tapered; and
   pumping liquid hydrocarbons from the hydrocarbon reservoir through a second conduit extending through the well.

15. The method of claim 14 further comprising collecting water removed from the gases by the at least one gas dehydrator.

16. The method of claim 14 further comprising powering a drive with gases produced from the first conduit, the drive being configured to pump the liquid hydrocarbons through the second conduit.

17. An apparatus for removing water from gases produced from a hydrocarbon reservoir penetrated by a well, the apparatus comprising:
   a first conduit extending through the well for producing gases;
   a second conduit extending through the well for producing liquid hydrocarbons;
   a pump connected to pump liquid hydrocarbons from the hydrocarbon reservoir through the second conduit;
   a gas dehydrator located in the first conduit below a ground surface for removing water from produced gases flowing through the first conduit;
   in which the gas dehydrator further comprises a series of condensation surfaces distributed along a portion of the first conduit and disposed at least partially across a gas-flow through the first conduit to define a gas channel that allows produced gases to flow through the gas dehydrator; and
   in which at least one condensation surface comprises a basin connected to receive water that condenses on the condensation surface.

18. The apparatus of claim 17 in which the basin has a drain at a bottom of the basin.

19. The apparatus of claim 18 in which the basin comprises a float operated hatch over the drain for draining the basin.

* * * * *